United States Patent
Wu

(10) Patent No.: US 10,728,575 B2
(45) Date of Patent: Jul. 28, 2020

(54) METHOD FOR ENCODING AND/OR DECODING IMAGES ON MACROBLOCK LEVEL USING INTRA-PREDICTION

(75) Inventor: Yu Wen Wu, Beijing (CN)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 1122 days.

(21) Appl. No.: 14/124,708

(22) PCT Filed: Jun. 7, 2011

(86) PCT No.: PCT/CN2011/075385
§ 371 (c)(1),
(2), (4) Date: Dec. 7, 2013

(87) PCT Pub. No.: WO2012/167418
PCT Pub. Date: Dec. 13, 2012

(65) Prior Publication Data
US 2014/0205008 A1    Jul. 24, 2014

(51) Int. Cl.
*H04N 11/02*    (2006.01)
*H04N 11/04*    (2006.01)
(Continued)

(52) U.S. Cl.
CPC ......... *H04N 19/593* (2014.11); *H04N 19/11* (2014.11); *H04N 19/172* (2014.11); *H04N 19/174* (2014.11); *H04N 19/176* (2014.11)

(58) Field of Classification Search
CPC .............................. H04N 7/50; H04N 7/26244
(Continued)

(56) References Cited

U.S. PATENT DOCUMENTS 7,724,820 B2    5/2010 Youn et al.
8,223,838 B2 *   7/2012 Iwata .................. H04N 19/176
                                                    375/240.12
(Continued)

FOREIGN PATENT DOCUMENTS

CN    1956546 A    5/2007
EP    2346259       7/2011
(Continued)

OTHER PUBLICATIONS

Ballé et al., "Extended Texture Prediction for H.264/AVC Intra Coding", Image Processing, 2007. ICIP 2007. IEEE International Conference on Sep. 16, 2007-Oct. 19, 2007, (vol. 6 ), pp. VI-93-VI-96.
(Continued)

*Primary Examiner* — Chikaodili E Anyikire
(74) *Attorney, Agent, or Firm* — Tutunjian & Bitetto, P.C.

(57) ABSTRACT

Conventional intra-prediction uses pixels from left and upper neighbour blocks to predict a macroblock (MB). Thus, the MBs must be sequentially processed, since reconstructed left and upper MBs must be available for prediction. In an improved method for encoding Intra predicted MBs, a MB is encoded in two steps: first, a first portion of the MB is encoded independently, without references outside the MB. Pixels of the first portion can be Intra predicted using DC mode. Then, the first portion is reconstructed. The remaining pixels of the MB, being a second portion, are intra predicted from the reconstructed pixels of the first portion and then reconstructed. The first portion comprises at least one column or one row of pixels of the MB. The encoding is applied to at least two Intra predicted MBs per slice, or per picture if no slices are used.

24 Claims, 3 Drawing Sheets

(51) Int. Cl.
*H04N 7/12* (2006.01)
*H04N 19/593* (2014.01)
*H04N 19/176* (2014.01)
*H04N 19/11* (2014.01)
*H04N 19/174* (2014.01)
*H04N 19/172* (2014.01)

(58) Field of Classification Search
USPC .................................. 375/240.12–240.16
See application file for complete search history.

(56) References Cited

U.S. PATENT DOCUMENTS

| | | | |
|---|---|---|---|
| 9,380,298 B1* | 6/2016 | Gu ..................... | H04N 19/00 |
| 2003/0099294 A1 | 5/2003 | Wang et al. | |
| 2004/0258162 A1* | 12/2004 | Gordon ................ | H04N 19/91 |
| | | | 375/240.25 |
| 2005/0123043 A1 | 6/2005 | Wang et al. | |
| 2005/0157797 A1* | 7/2005 | Gaedke ............... | H04N 19/105 |
| | | | 375/240.24 |
| 2006/0126730 A1* | 6/2006 | Arakawa ............. | H04N 19/176 |
| | | | 375/240.03 |
| 2006/0222066 A1 | 10/2006 | Yoo et al. | |
| 2008/0219349 A1* | 9/2008 | Huang ................. | H04N 19/176 |
| | | | 375/240.15 |
| 2008/0225950 A1 | 9/2008 | Zhu | |
| 2008/0232472 A1* | 9/2008 | Kwon ................. | H03M 13/356 |
| | | | 375/240.13 |
| 2008/0240253 A1 | 10/2008 | Au et al. | |
| 2008/0240587 A1 | 10/2008 | Au et al. | |
| 2010/0246675 A1* | 9/2010 | Gharavi-Alkhansari .................... | |
| | | | H04N 19/105 |
| | | | 375/240.13 |
| 2010/0290527 A1* | 11/2010 | Park .................... | H04N 19/176 |
| | | | 375/240.13 |
| 2011/0249741 A1* | 10/2011 | Zhao ................... | H04N 19/197 |
| | | | 375/240.15 |
| 2013/0051469 A1* | 2/2013 | Park .................... | H04N 19/159 |
| | | | 375/240.14 |
| 2014/0205008 A1* | 7/2014 | Wu ..................... | H04N 19/593 |
| | | | 375/240.12 |

FOREIGN PATENT DOCUMENTS

| | | |
|---|---|---|
| KR | 100974983 B1 | 8/2010 |
| WO | WO 2006109985 A1 | 10/2006 |
| WO | WO2010039000 | 4/2010 |

OTHER PUBLICATIONS

Tan et al:; Intra Prediction by Template Matching2; Image Processing, 2006 IEEE International Conference on Oct. 8-11, 2006, pp. 1693-1696.
Search Report dated Mar. 15, 2012.
Fleury et al., "MPEG-4 video verification model: A solution for interactive multimedia applications", Journal of Electronic Imaging, SPIE vol. 7, Jul. 1, 1998, pp. 502-515.
Peng et al., "Improved Line-based Image Coding by Exploiting Long-Distance Correlations", Visual Comunications and Image Processing, Jul. 11, 2010, pp. 77441D-1-8.
Tabatabai et al., "Tool Experiment 6: Intra-Prediction Improvement", 2. JTC-VC Meeting Jul. 21-28, 2010, Geneva, Switzerlanf, Document JCTVC-B306, pp. 1-12.
Peng et al., "TE06.a: report of line-based coding", 94. MPEG Meeting; Oct. 11-15, 2010, Guagzhou, China, Document: JCTVC-C270, pp. 1-5.
Alam T., "Fast DC Mode Prediction Scheme for Intra 4x4 Block in H.264/AVC Video Coding Standard", Int. Journal of Advanced Computer Science and Applications, vol. 3, No. 9, Sep. 1, 2012, pp. 90-94.
Lai et al., "New intra prediction using the correlation between pixels and lines", 2. JTC-VC Meeting Jul. 21-28, 2010, Geneva, Switzerland, Document JCTTV-B040, pp. 1-4.
Chen et al., "Video coding using extended block sizes", Video Coding Experts Group—AJ23, ITU—Telecommunications Study Group, VCEG-AJ23, 36th Meeting, San Diego, USA, Oct. 8-10, 2008. pp. 1-4.
Shiodera et al., "Bidirectional Intra Prediction", Video Coding Experts Group—AE14, ITU—Telecommunications Standardization Sector, 31st Meeting Marrakech, Morocco, Jan. 15-16, 2007, pp. 1-6.
Ye et al., "Improved Intra Coding", Video Coding Experts Group—AG11, ITU—Telecommunications Standardization Sector, 33rd Shenzhen, China, Oct. 20, 2007, pp. 1-6.
Telecommucications Std Section of ITU-REC-H 264, "Advanced Vid,eo Coding for Generic Audiovisual Services", Nov. 2007, pp. 1-564.
Yin et al., "Hierarchy-Based Fast Intra Prediction Algorithm", Journal of Beijing University of Technology, vol. 32, No. 3, Mar. 2006, pp. 1-6. English Abstract.
Parallel Multiple-Symbol Variable-Length Decodingorganization: Tampere Univ Technol | Inst Digital & Comp Systsource: ICCD'2002: IEEE International Conference on Computer Design: VLSI in Computers and Processors, Proceedings | : 126-131 2002publisher: IEEE Computer Soc.

* cited by examiner a)

b)

METHOD FOR ENCODING AND/OR DECODING IMAGES ON MACROBLOCK LEVEL USING INTRA-PREDICTION

This application claims the benefit, under 35 U.S.C. § 365 of International Application PCT/CN2011/075385, filed Jun. 7, 2011, which was published in accordance with PCT Article 21(2) on Dec. 13, 2012 in English.

FIELD OF THE INVENTION

This invention relates to the technical field of digital video coding. In particular, it relates to a method for encoding images on macroblock level and a method for decoding images on macroblock level, whereby intra prediction is used.

BACKGROUND

The H.264/AVC video coding standard offers several kinds of Intra prediction to reduce spatial redundancy between spatially adjacent blocks. In Intra prediction, pixels from already coded neighbouring blocks of a current block are used to predict the current block. For coding of the luminance signal, H.264 allows a total of nine Intra prediction modes for 4×4 and 8×8 blocks, and a total of four Intra prediction modes for 16×16 blocks. Similarly, a total of four Intra modes are usable to predict 8×8 chroma blocks for chrominance signals.

In recent years, several new Intra coding methods were proposed. For example in "Intra Prediction by Template Matching" by T. K. Tan, C. S, Boon and Y. Suzuki in Proc. ICIP'06, October 2006, template matching (TM) is used to search for matching blocks within the already coded areas of the current frame. In TM, both the encoder and the decoder perform the same motion search using already coded neighbouring pixels, therefore eliminating the need for coding the motion vectors. In "Extended Texture Prediction for H.264/AVC Intra Coding" by J. Balle and M. Wien in Proc. ICIP'07, October 2007, a combination of TM and Displaced Intra Prediction (DIP) are used. Similar to TM, DIP uses motion search to find matching blocks in the already coded areas of the current frame. Unlike TM, DIP performs motion search using the current block and sends the motion vectors to the decoder. Further, a new Intra coding method named Bidirectional Intra Prediction (BIP) was proposed by VCEG. BIP uses two techniques: combining two existing prediction modes to form bi-directional prediction modes, and allowing alternative coding order of 4×4 and 8×8 blocks within a macroblock (MB).

Conventional intra-prediction uses pixels from left and upper neighbour blocks to predict a MB. The MBs must be sequentially processed, since a reconstructed left and upper MB must be available for prediction. In at least all the above-mentioned Intra coding methods, the reconstructed pixels from the same slice as a current MB but not belonging to the current MB are necessary for Intra prediction of the current MB. Due to this characteristic, all the Intra MBs in a slice must be serially decoded.

SUMMARY OF THE INVENTION

It would be desirable to design an Intra prediction method which is more independent from adjacent reconstructed MBs. The present invention discloses an Intra prediction method that solves at least the above-mentioned problems, and provides further advantages mentioned below.

According to the invention, an Intra predicted MBs is encoded in two steps: first, a first portion of the MB is encoded independently, that is by using Intra prediction without further references outside the MB. This first portion is called independent portion herein, and the pixels of the first portion are called independent pixels. For example, all pixels of the first portion are Intra predicted using DC mode, or one or more first pixels of the first portion are Intra predicted using DC mode and other pixels of the first portion are predicted from the one or more first pixels. Then, the first portion is reconstructed. A second portion of the MB (being the remaining pixels of the MB) is intra predicted from the reconstructed pixels of the first portion, using any intra prediction mode, and then reconstructed. The first portion comprises at least one column or one row of the MB, or half the pixels of one column and half the pixels of one row. The encoding is applied to at least two Intra predicted MBs per slice, or to at least two Intra predicted MBs per picture if no slices are used. In one embodiment, the encoding is applied to all Intra predicted MBs of a slice or a picture.

A corresponding decoding method comprises decoding pixels a first portion of a macroblock without referencing other pixels outside the first portion of the macroblock, and decoding pixels of a second portion of the macroblock using intra prediction, wherein the intra prediction references pixels of the first portion of the macroblock or previously encoded pixels of the second portion of the macroblock.

The disclosed Intra prediction allows encoding and decoding of MBs independent from other MBs, so that high performance parallel Intra coding and/or decoding is easily possible. Furthermore, video coder/decoder processing can be accelerated with the disclosed Intra prediction method. Even within a slice, simultaneously encoding and simultaneously decoding can begin and continue with a plurality of MBs of the same slice in parallel. Thus, intra-prediction of video, and particularly high-resolution video, can be further improved, so that it is more efficient.

An apparatus for encoding is disclosed in claim 13, and an apparatus for decoding is disclosed in claim 15.

According to the invention, a method for encoding and/or decoding an image on macroblock level using intra-prediction comprises for at least two MBs per slice or picture the steps of encoding and/or decoding a first portion (at least one row and one column, or at least half the pixels of one row and half the pixels of one column) using no prediction references, reconstructing the first portion, encoding and/or decoding the remainder of each MB using prediction based on the reconstructed first portion, and (for decoding) reconstructing the remainder.

In more particular, according to the invention, a method for encoding macroblocks of an image using intra prediction comprises steps of dividing a macroblock into two portions, wherein a first portion comprises at least one column or one row, or half the pixels of one column and half the pixels of one row, and a second portion comprises remaining pixels of the macroblock, encoding pixels of the first portion of the macroblock without referencing pixels outside the first portion of the macroblock, and encoding pixels of the second portion of the macroblock using intra prediction, wherein the intra prediction references said pixels of the first portion of the macroblock or previously encoded pixels of the second portion of the macroblock.

Further according to the invention, a method for decoding macroblocks of an image using intra prediction comprises steps of determining an intra-coded macroblock in an encoded picture, decoding pixels of a first portion of the macroblock without referencing other pixels outside the first portion of the macroblock, and decoding pixels of a second portion of the macroblock using intra prediction, wherein the intra prediction references previously decoded pixels of the first portion of the macroblock or of the second portion of the macroblock.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 an 8×8 MB and its surrounding pixels from reconstructed MBs for conventional intra-prediction.

DETAILED DESCRIPTION OF THE INVENTION

Figure 1:
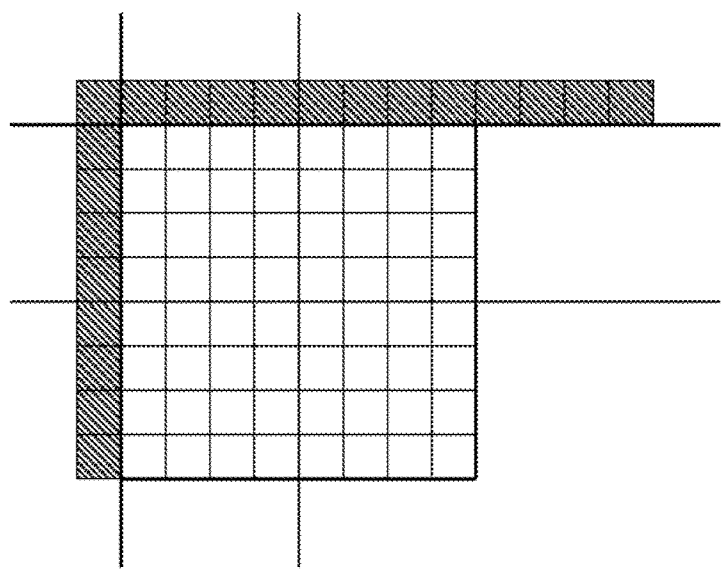

FIG. 1 shows an example of a MB being decoded, which includes 8×8 pixels (white blocks). The shaded pixels are the potential reconstructed pixels from neighbour MBs, which may conventionally be used in reconstructing the current MB. E.g. some or all those shaded pixels will be used when reconstructing the current MB in H.264 Intra prediction. This results in a dependence between a currently decoded MB and its adjacent MBs in left, top, top-left and top-right direction. Thus, the adjacent MBs which include shaded pixels in FIG. 1 must be decoded before decoding the current MB. With this kind of prediction, it is hard to parallelize Intra decoding. In other words, it is a bottleneck of developing parallel video decoders e.g. with multi-core processors, such as Intel dual-core CPU and GPU.

The present invention can eliminate this dependence and provide a new independence Intra prediction, which allows Intra decoding processing to be parallelized. To remove the dependency between MBs during Intra prediction, no pixels from other MBs are involved in Intra prediction. There is a DC mode in H.264 Intra prediction mode which does not need pixels from other MBs. The prediction value of DC mode is $$\text{Pred}=(1<<(\text{BitDepth}_y-1)) \quad (\text{eq.1})$$

Here, BitDepth$_y$ is bit depth of luma. However, if every pixel in a current MB is predicted by the DC mode, the coding performance will be not good enough.

Figure 2:
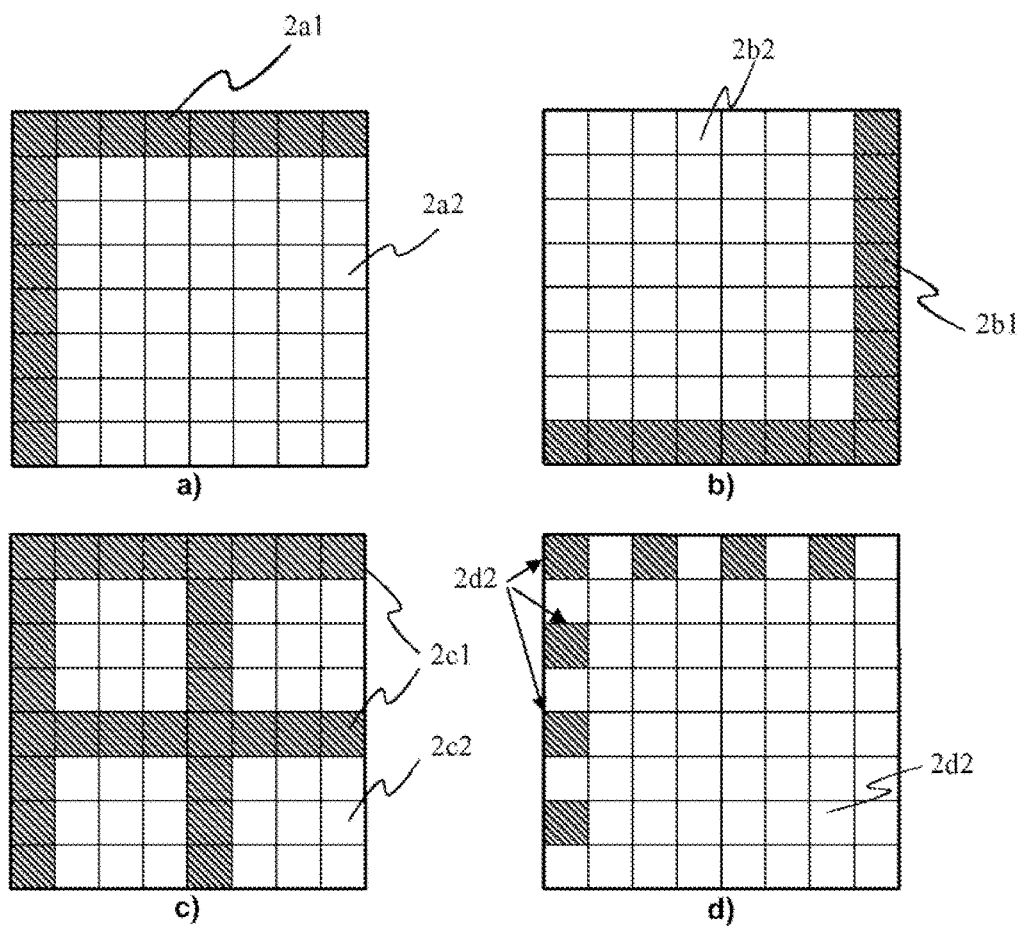
FIG. 2 various arrangements of independent and dependent pixels in an 8×8 MB.

As a solution, the pixels in a current MB are divided into two classes, as shown in FIG. 2. The shaded pixels 2a1, 2b1,2c1,2d1 are the independent pixels, and are used to predict the other pixels 2a2,2b2,2c2,2d2. Various partitions are possible: FIG. 2 shows four exemplary kinds of partition. E.g., in FIG. 2c), the independent pixels 2c1 are the first portion to be encoded, and the remaining pixels 2c2 are the second portion. However, to be effective, the first partition must be at least one row or one column, or both half the pixels of one column and half the pixels of one row (such as in FIG. 2d), where the first portion 2d1 comprises every other pixel of both one row and one column), regardless which row or which column. Higher efficiency can be achieved when the first partition covers one full row and one full column, as shown in FIG. 2a)-c), regardless which row or which column. Different partitions will bring on different prediction modes for the pixels of the second portion. We call the shaded pixel independent pixels and the remaining (white) pixels dependent pixels. So, the Intra prediction processing is divided into two parts. First, the independent pixels are predicted by an independent mode, such as DC mode in eq.(1). Another solution would be to encode the actual value. Second, the other pixels are predicted by any conventional or new intra coding mode, such as modes used in H.264 or in BIP.

Figure 3:
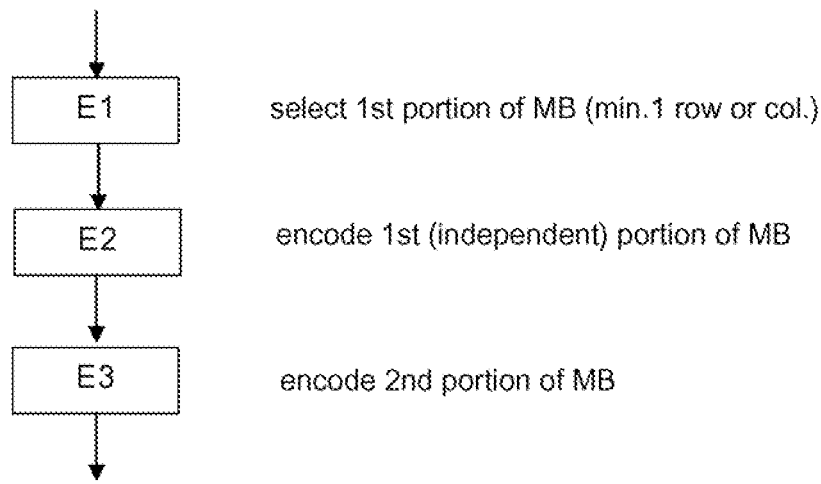
FIG. 3 a flow-chart of the encoding method.

FIG. 3 shows a flow-chart of the method for encoding macroblocks of an image using intra prediction. The method comprises steps of dividing E1 a MB into two portions, wherein a first portion comprises at least one column or one row, and a second portion comprises remaining pixels of the MB, encoding E2 pixels of the first portion of the MB without referencing pixels outside the first portion of the MB, and encoding E3 pixels of the second portion of the MB using intra prediction, wherein the intra prediction references said pixels of the first portion of the MB or previously encoded pixels of the second portion of the MB.

Various advantageous embodiments are the following:

In one embodiment, the step of encoding pixels of the first portion of the MB without referencing pixels outside the first portion of the MB comprises steps of encoding one or more first pixels of the first portion of the MB without reference, and encoding remaining second pixels of the first portion of the MB with referencing the first pixels.

In one embodiment, pixels that are referenced are reconstructed pixels, and the method further comprises a step of reconstructing the first portion of the MB before said step of encoding pixels of the second portion of the MB. If, in this embodiment, the step of encoding pixels of the first portion of the MB comprises encoding one or more first pixels of the first portion of the MB without reference and encoding remaining second pixels of the first portion of the MB with referencing the first pixels, then the encoded one or more first pixels of the first portion of the MB are reconstructed before encoding the remaining second pixels of the first portion of the MB.

In one embodiment, DC mode according to eq.(1) is used for the encoding of pixels without referencing other pixels. In one embodiment, the first portion comprises at least both one column and one row.

In one embodiment, the method further comprises a step of encoding an indication that indicates a MB encoded according to the current encoding method, i.e. in two portions.

In one embodiment, at least two intra-coded MBs per image are encoded simultaneously. In one embodiment, the image comprises at least one slice, and at least two intra-coded MBs in the at least one slice are encoded simultaneously. This may be done in one or more or all slices of the image. In one embodiment, the method further comprises a step of encoding an indication that indicates the coding mode for a MB.

Figure 4:
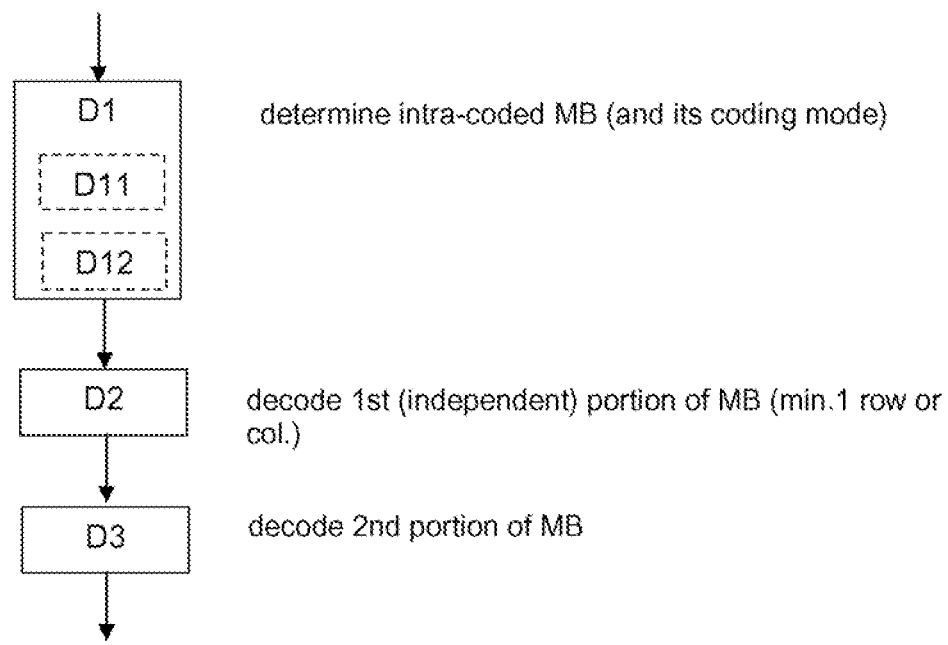
FIG. 4 a flow-chart of the decoding method.

FIG. 4 shows a flow-chart of the decoding method for decoding MBs of an image using intra prediction. The decoding method comprises steps of determining D1 an intra-coded MB in an encoded picture, decoding D2 pixels of a first portion of the MB without referencing other pixels outside the first portion of the MB, and decoding D3 pixels of a second portion of the MB using intra prediction, wherein the intra prediction references previously decoded pixels of the first portion of the MB or of the second portion of the MB.

Various advantageous embodiments are the following:

In one embodiment, the step of determining a MB comprises steps of decoding D11 an indication that refers to a MB, evaluating D12 the indication, and upon evaluating the indication and determining the coding mode, performing said steps of decoding pixels of the first portion of the MB and decoding pixels of the second portion of the MB.

In one embodiment, the first portion comprises one full column and one full row of pixels. In one embodiment, the method further comprises a step of encoding an indication that indicates a MB encoded according to the current encoding method. In one embodiment, the image comprises at least one slice, and at least two intra-coded MBs in the at least one slice are decoded simultaneously. This may be done in one or more or all slices of the image.

Any Intra prediction mode that does not depend on other pixels can be utilized to predict the independent pixel. The DC mode mentioned above is an example. The prediction mode used for dependent pixels may depend on the pixel partition in a MB. Different partitions may result in different prediction modes of the dependent pixels. For example for the partition shown in FIG. 2a), after prediction and reconstruction of the independent pixels, we get the reconstructed version of the independent pixels. With those pixels, we can reuse most Intra prediction modes in H.264 and DIP (with simple modifications). While the MB size in H.264 is 16×16 for luma, recent research shows larger MB size benefits to coding efficiency, especially for super HD resolution. The disclosed new Intra prediction can be used for this purpose, since it is easily applicable for any MB size.

Figure 5:
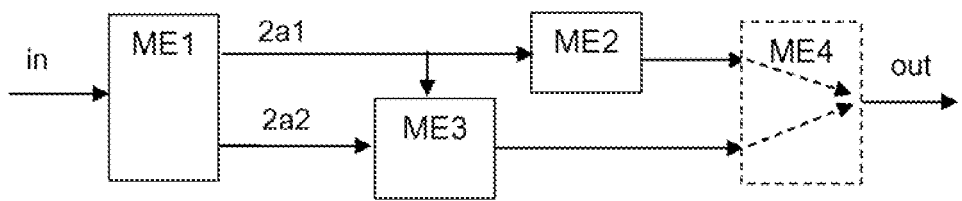
FIG. 5 the structure of an encoder.
Figure 5:
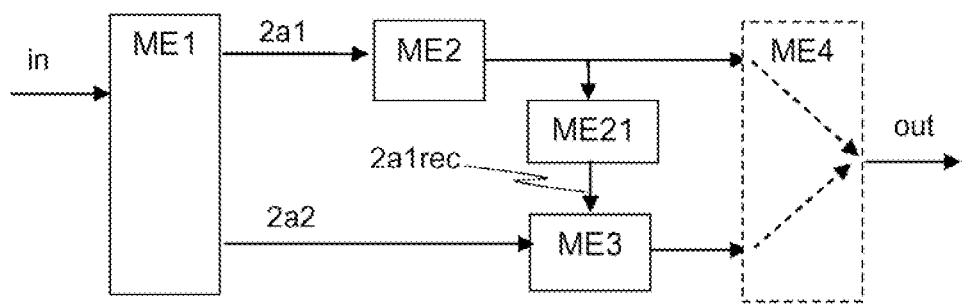

In one embodiment, as shown in FIG. 5a), an apparatus for encoding MBs of an image using intra prediction comprises dividing means ME1 for dividing a MB into two portions, wherein a first portion comprises at least one column or one row, and a second portion comprises remaining pixels of the MB, first encoding means ME2 for encoding pixels of the first portion 2a1 of the MB without referencing pixels outside the first portion of the MB, and second encoding means ME3 for encoding pixels of the second portion 2a2 of the MB using intra prediction, wherein the intra prediction references said pixels of the first portion 2a1 of the MB or previously encoded pixels of the second portion 2a2 of the MB. The encoded pixels of the first and the second portion of the MB can be simply combined to an encoded MB, e.g. in a combiner means ME4. The combiner means ME4 may comprise a buffer (not shown in FIG. 5) for adjusting the delay that is caused by the second encoding means ME3, so that the encoded pixels of the first and the second portion of the MB are simultaneously available at the output of the apparatus for encoding (or encoder).

In one embodiment of the apparatus for encoding, pixels that are referenced are reconstructed pixels 2a1rec, and the apparatus further comprises reconstruction means ME21 for reconstructing the pixels of the encoded first portion 2a1 of the MB before these reconstructed pixels are referenced in the second encoding means ME3. This embodiment is shown in FIG. 5b).

Figure 6:
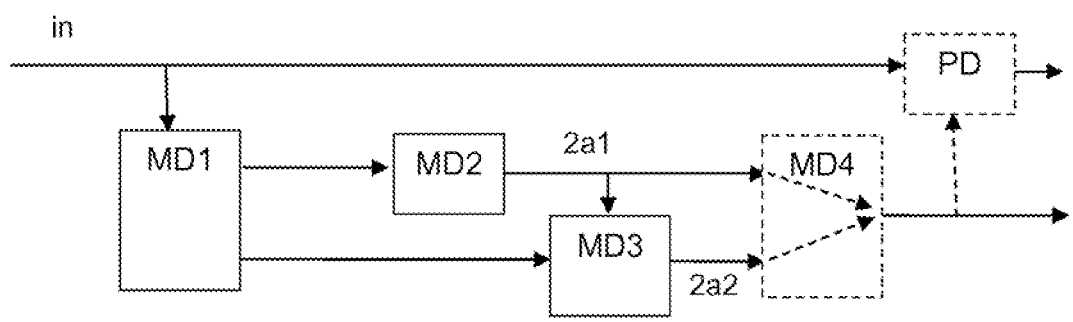
FIG. 6 the structure of a decoder.

In one embodiment, as shown in FIG. 6, an apparatus for decoding MBs of an image using intra prediction comprises determining means MD1 for determining an intra-coded macroblock in an encoded picture, first decoding means MD2 for decoding pixels of a first portion of the MB without referencing other pixels outside the first portion of the MB, and second decoding means MD3) for decoding pixels of a second portion of the MB using intra prediction, wherein the intra prediction references previously decoded pixels of the first portion of the MB or of the second portion of the MB. I.e., the intra prediction refers to previously decoded pixels of the first portion of the MB, or to previously decoded pixels of the second portion of the MB. The decoded pixels of the first and the second portion of the MB can be simply combined to a decoded MB, e.g. in a combiner means MD4. The combiner means MD4 may comprise a buffer (not shown in FIG. 6) for adjusting the delay that is caused by the second decoding means MD3, so that the decoded pixels of the first and the second portion of the MB are simultaneously available at the output of the apparatus for decoding (or decoder).

The intra coded pixels are detected from an input stream in. It is possible that one or more remaining MBs of the encoded image in are intra-coded using a conventional mode, or that at least some remaining MBs are inter-coded and will be decoded in a predictive decoder PD, which may use the reconstructed intra-predicted MBs for prediction.

A particular advantage of the invention is that encoding or decoding of a slice can be performed in parallel simultaneously for each independent MB (i.e. MB that is intra-coded according to the invention); further, each of these independent MBs can be followed by one or more dependent MBs (i.e. intra-coded MBs that use conventional intra prediction and use the MBs as reference). Thus, each slice can effectively be sub-divided into an arbitrary number of MB groups, each having one independent MB as a coding/decoding start point. For example, if a slice has K independent MBs (e.g. K=10), it can be encoded/decoded in up to K parallel simultaneous encoding/decoding processes. Thus, encoding and/or decoding can be adaptively accelerated.

It will be understood that the present invention has been described purely by way of example, and modifications of detail can be made without departing from the scope of the invention. While there has been shown, described, and pointed out fundamental novel features of the present invention as applied to preferred embodiments thereof, it will be understood that various omissions and substitutions and changes in the apparatus and method described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated.

Each feature disclosed in the description and (where appropriate) the claims and drawings may be provided independently or in any appropriate combination. Features may, where appropriate be implemented in hardware, software, or a combination of the two. Reference numerals appearing in the claims are by way of illustration only and shall have no limiting effect on the scope of the claims.

The invention claimed is:

1. A method for encoding a block of an image using intra prediction, said encoding of a block comprising:
dividing the block into two portions, wherein a first portion comprises independent pixels of the block, and a second portion comprises remaining pixels of the block;
intra-predicting the independent pixels of the first portion using a DC mode according to pred=$(1<<(BitDepth_y-1))$, wherein $BitDepth_y$ is a bit depth of pixels of the block;

encoding the first portion using said intra-predicted pixels of the first portion without referencing the remaining pixels outside the first portion;

reconstructing encoded pixels of the first portion;

intra-predicting one or more of the remaining pixels of the second portion using reconstructed pixels of the first portion or one or more previously reconstructed pixels of the second portion;

encoding the second portion using said one or more intra-predicted pixels of the second portion;

reconstructing the one or more previously encoded pixels of the second portion;

combining encoded pixels of the first portion and encoded pixels of the second portion to obtain an encoded block, said encoded block being encoded by an intra coding mode; and encoding an indication that said block is encoded according to said intra coding mode.

2. The method of claim 1, wherein the first portion comprises at least half the pixels of one column and half the pixels of one row.

3. The method of claim 1, wherein said intra coding mode depends on block division into two portions.

4. The method of claim 1, wherein a size of a block encoded according to said intra prediction mode is larger than 16×16.

5. The method of claim 1, wherein the image comprises at least one slice, and wherein at least two intra-coded blocks per slice are encoded simultaneously.

6. The method of claim 1, further comprising adjusting a delay between the encoded pixels of the first portion and the encoded pixels of the second portion to obtain said encoded block.

7. A method for decoding a block of an image using intra prediction, said decoding of a block comprising decoding an indication that a block is encoded according to an intra coding mode and upon evaluating said intra coding mode:

determining two portions in the block, wherein a first portion comprises independent pixels of the block, and a second portion comprises remaining pixels of the block;

intra-predicting the independent pixels of the first portion using a DC mode according to pred=(1<<(BitDepth$_y$−1)), wherein BitDepth$_y$ is a bit depth of pixels of the block;

decoding the first portion using said intra-predicted pixels of the first portion without referencing the remaining pixels outside the first portion;

intra-predicting one or more pixels of the second portion using decoded pixels of the first portion or one or more previously decoded pixels of the second portion;

decoding the second portion using said one or more intra-predicted pixels of the second portion;

combining decoded pixels of the first portion and decoded pixels of the second portion to obtain a decoded block.

8. The method of claim 7, wherein the first portion comprises at least half the pixels of one column and half the pixels of one row.

9. The method of claim 7, wherein said intra coding mode depends on block division into two portions.

10. The method of claim 7, wherein a size of a block encoded according to said intra coding mode is larger than 16×16.

11. The method of claim 7, wherein the image comprises at least one slice, and wherein at least two intra-coded blocks per slice are decoded simultaneously.

12. The method of claim 7 further comprising adjusting the delay between the decoded pixels of the first portion and the decoded pixels of the second portion to obtain a decoded block.

13. An apparatus for encoding a block of an image using intra prediction, said apparatus comprising one or more processors configured to:

divide the block into two portions, wherein a first portion comprises independent pixels of the block, and a second portion comprises remaining pixels of the block;

obtain intra-predicted pixels of the first portion using a DC mode according to pred=(1<<(BitDepth$_y$−1)), wherein BitDepth$_y$ is a bit depth of pixels of the block;

encode the first portion using said intra-predicted pixels of the first portion without referencing pixels outside the first portion;

reconstruct the encoded pixels of the first portion;

obtain one or more intra-predicted pixels of the second portion using reconstructed pixels of the first portion or one or more previously reconstructed pixels of the second portion;

encode the second portion using said one or more intra-predicted pixels of the second portion;

reconstruct the one or more previously encoded pixels of the second portion;

combine encoded pixels of the first portion and encoded pixels of the second portion to obtain an encoded block, said encoded block being encoded according to an intra coding mode; and encode an indication that said block is encoded according to said intra coding mode.

14. The apparatus of claim 13, wherein the first portion comprises at least half the pixels of one column and half the pixels of one row.

15. The apparatus of claim 13, wherein said intra coding mode depends on block division into two portions.

16. The apparatus of claim 13, wherein a size of a block encoded according to said intra coding mode is larger than 16×16.

17. The apparatus of claim 13, wherein the image comprises at least one slice, and wherein at least two intra-coded blocks per slice are encoded simultaneously.

18. The apparatus of claim 13 further comprising a buffer for adjusting the delay between the encoded pixels of the first portion and the encoded pixels of the second portion to obtain said encoded block.

19. An apparatus for decoding a block of an image using intra prediction, said apparatus comprising one or more processors configured to decode an indication that a block is encoded according to an intra coding mode and upon evaluating said intra coding mode:

determine two portions in the block, wherein a first portion comprises independent pixels of the block, and a second portion comprises remaining pixels of the block;

obtain intra-predicted pixels of the first portion using a DC mode according to pred=(1<<(BitDepth$_y$−1)), wherein BitDepth$_y$ is a bit depth of pixels of the block;

decode first portion using said intra-predicted pixels of the first portion without referencing other pixels outside the first portion;

obtain intra-predicted one or more pixels of the second portion using decoded pixels of the first portion or one or more previously decoded pixels of the second portion;

decode second portion using said one or more intra-predicted pixels of the second portion;

combine decoded pixels of the first portion and decoded pixels of the second portion to obtain a decoded block.

20. The apparatus of claim 19, wherein the first portion comprises at least half the pixels of one column and half the pixels of one row.

21. The apparatus of claim 19, wherein said intra coding mode depends on block division into two portions.

22. The apparatus of claim 19, wherein a size of a block encoded according to said intra coding mode is larger than 16×16.

23. The apparatus of claim 19, wherein the image comprises at least one slice, and wherein at least two intra-coded blocks per slice are decoded simultaneously.

24. The apparatus of claim 19, further comprising a buffer for adjusting the delay between the decoded pixels of the first portion and the decoded pixels of the second portion to obtain said decoded block.

* * * * *

UNITED STATES PATENT AND TRADEMARK OFFICE
CERTIFICATE OF CORRECTION

| | |
|---|---|
| PATENT NO. | : 10,728,575 B2 |
| APPLICATION NO. | : 14/124708 |
| DATED | : July 28, 2020 |
| INVENTOR(S) | : Yu Wen Wu et al. |

Page 1 of 1

It is certified that error appears in the above-identified patent and that said Letters Patent is hereby corrected as shown below:

On the Title Page

Column 1, Lines 1-2, Below "(54) METHOD FOR ENCODING AND/OR DECODING IMAGES ON MACROBLOCK LEVEL USING INTRAPREDICTION" insert
--(71) Applicant: INTERDIGITAL VC HOLDINGS, INC., Wilmington, DE US--.

Page 2 Column 2 Line 9 (Item (56) Other Publications) Delete "Comunications" and insert --Communications--.

Page 2 Column 2 Line 12 (Item (56) Other Publications) Delete "Switzerlanf," and insert --Switzerland,--.

Page 2 Column 2 Line 35 (Item (56) Other Publications) Delete "Telecommucications" and insert --Telecommunications--.

Page 2 Column 2 Line 36 (Item (56) Other Publications) Delete "Vid,eo" and insert --Video--.

In the Specification

Column 1 Line 5 Delete "365" and insert --371--.

Signed and Sealed this
Seventh Day of February, 2023

Katherine Kelly Vidal
*Director of the United States Patent and Trademark Office*